UNITED STATES PATENT OFFICE.

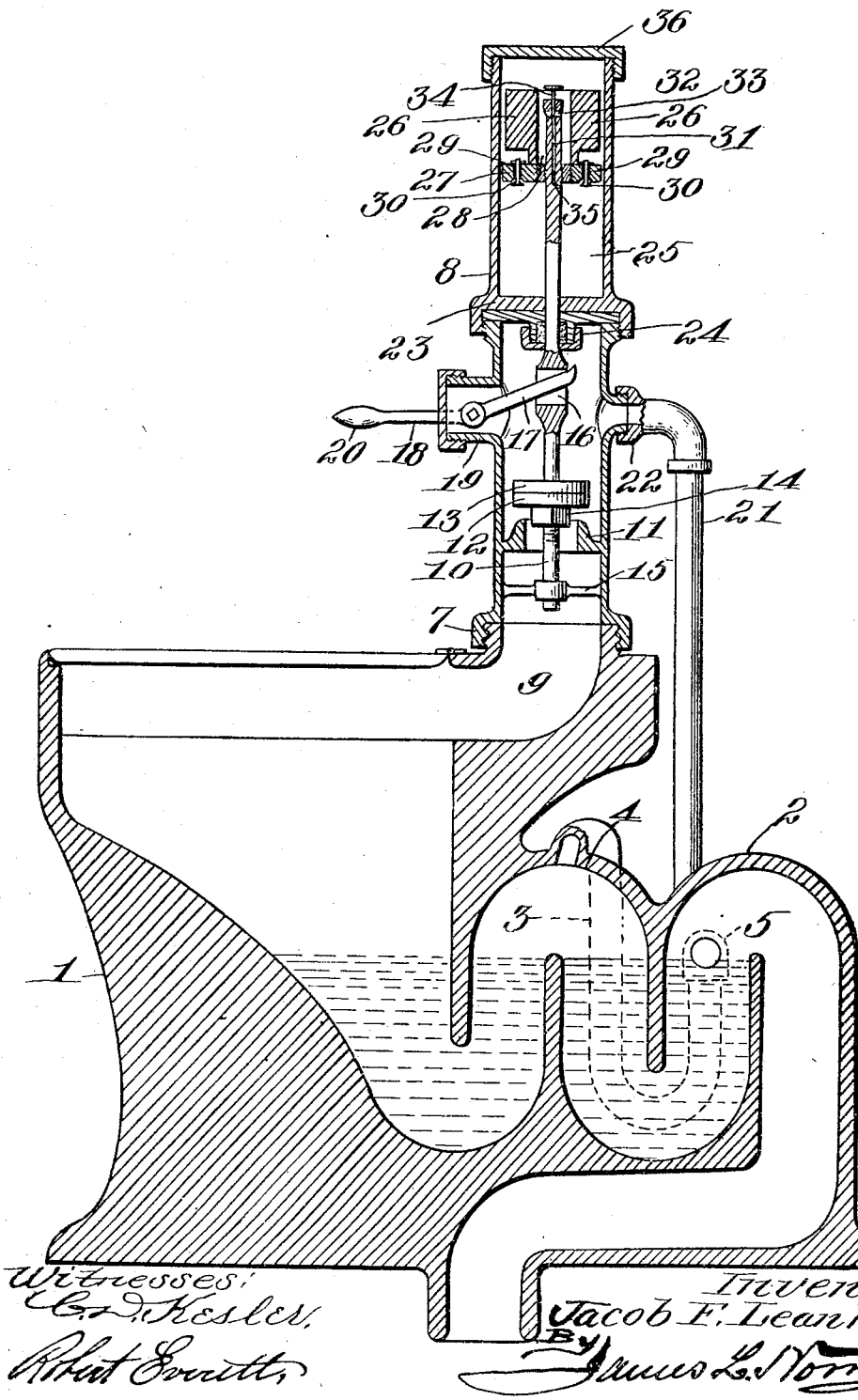

JACOB F. LEANHART, OF LOUISVILLE, KENTUCKY.

WATER-CLOSET.

No. 796,848.  Specification of Letters Patent.  Patented Aug. 8, 1905.

Application filed July 14, 1904. Serial No. 216,536.

*To all whom it may concern:*

Be it known that I, JACOB F. LEANHART, a citizen of the United States, residing at Louisville, in the county of Jefferson and State of Kentucky, have invented new and useful Improvements in Water-Closets, of which the following is a specification.

This invention relates to water-closets and urinals, and particularly to means for replacing or superseding tanks for siphon closets and urinals; and it consists of a double-S trap disposed in operative relation to the bowl and provided with an auxiliary siphon-tube to effect a more positive seal and an increased hygienic structure, and a valve mechanism having a non-freezing liquid cushion and partial automatic operation for controlling the water-supply to the bowl, the water-supply and prolongation of the flush being regulable by adjustment of parts of the valve mechanism.

The drawing represents a section through a bowl, trap, and valve mechanism embodying the features of the invention.

The numeral 1 designates a water-closet or urinal-bowl having a double-S trap 2, supplied with an outside auxiliary siphon-tube 3, connecting flush with the top elbow 4 of the inner member of the trap and passes down alongside the outer portion of the inner trap member and upward alongside the inner portion of the outer trap member and has a union connecting with the latter at or slightly above the normal water-seat level. The trap and siphon-tube may be placed at right angles to or parallel with the front of the bowl, as may be most convenient. Above the bowl 1 and attached thereto by a union 7 is a cylinder 8, containing the valve mechanism and contributing elements, the lower end of said cylinder opening into an inlet 9 at the rear upper portion of the bowl, the said inlet having such communicating direction with relation to the bowl-rim as to cause the water entering the bowl to have a positive and effective swirl.

A plunger-rod 10 is centrally disposed in the cylinder 8 and movable through a lower valve-seat 11, the rod carrying the valve-washer 12, held in place by a valve-plate 13 and a locknut 14. Below the valve-seat 11 and attached to the plunger-rod 10 is a follower or guide 15, which operates to prevent the plunger-rod from becoming displaced or having lateral movement, and thereby always insure a practical registration of the washer 12 with the seat 11 when the plunger-rod is in its full lower position. Above the valve-washer 12 and plate 13 the plunger-rod 10 is formed with a slotted enlargement 16, through which the inner upwardly-inclined extremity 17 of an actuating-lever 18 projects, said lever 18 being pivotally held within an extension 19 of the cylinder and inclosed in such manner as to provide a water-tight joint. The operating-lever 18 extends forwardly within easy reaching distance with respect to the bowl 1 and terminates in an outer handle or grip 20. At a point opposite the extension 19 a water-supply pipe 21 is connected to the cylinder by a union 22, the valve-washer 12 and its plate 13 always being below the inlet for the water from the pipe 21. Above the point of connection of the pipe 21 with the cylinder the latter has a dividing partition 23 with a depending stuffing-box 24, through which and the said partition the plunger-rod 10 movably continues into an upper cushioning-compartment 25, forming part of the cylinder 8.

On the upper extremity of the plunger-rod 10 a packing-ring 27 is secured and acts as a piston-head during the operation of said rod. The plunger-rod projects above the packing-ring, and the latter has a weight 26 held thereon, formed with an intermediate space or opening 28 to expose the upper end of the plunger-rod. The packing-ring 27 is secured on the plunger-rod by suitable means and has opposite openings 29 therein, through which stems of downwardly-opening valves 30 are movably mounted. These valves are of gravitating type and are closed by pressure exerted or impacted against the under side of the packing-ring.

The upper extremity of the plunger-rod 10 has a by-pass 31 formed therein by longitudinally boring the same to establish communication between the upper and lower portions of the cushioning-compartment 25, respectively located above and below the packing-ring 27, the upper end of the plunger-rod being provided with a cap 32, having a transverse opening 33 between the same and the upper outlet of the by-pass 31. A needle-valve 34 is vertically arranged in the cap 32 and has its lower reduced end disposed over the upper outlet of the by-pass, said upper end of the by-pass being formed as a seat to receive the end of the needle-valve. The lower terminal of the by-pass 31 is deflected laterally, as at 35, through the plunger-rod below the packing-ring 27, but close to the latter to render the operation, which will be hereinafter set forth, more effective. The distance of the lower outlet or communicating opening of the by-pass with respect to the compartment 25 may be varied. The adjustment of the needle-valve 33 in opposite vertical directions controls the dimension of the communicating opening between the upper end of the plunger-rod and the by-pass 31 and the upper part of the cushioning-compartment 25. The compartment 25 also has a closed cap 36 of the screw-threaded type to render the interior of the compartment 25 accessible for the purpose of adjusting the needle-valve 33 and also for supplying the compartment 25 with the liquid it is adapted to contain. By locating the by-pass 31 in the plunger-rod and the needle-valve 33 within the compartment 25, as set forth, convenience in structure results and tampering with the valve is prevented, and hence after the proper adjustment has been made it will remain constant.

The cushioning-compartment 25 is filled with oil, glycerin, alcohol, or other non-freezing liquid to provide a cushion therein, and the flow of such liquid from the lower to the upper part of the compartment is regulated by the adjustment of the needle-valve 33, and such flow controls the downward movement of the washer 12 and its plate 13 toward the valve-seat 11 to regulate the flow of water into the bowl. The weight 26 will be so positioned with respect to the valves 30 that the latter will not be retarded in their operation, but efficiently act to check the upward flow of the cushioning liquid in the compartment 25 when the packing-ring 27 moves downwardly. A downward pressure on the operating-lever 18 raises the plunger-rod 10 and lifts the washer 12 and its plate 13 from the seat 11. The upward movement of the packing-ring 27 forces the liquid in the upper part of the compartment 25 partly through the by-pass 31 and partly through the valves 30 into the lower portion of said compartment. The liquid in the lower part of the compartment 25 forms a cushion or resistance which obstructs the immediate closing of the valve-washer 12, and the water flows downwardly through the cylinder and valve-seat 11 into the inlet 9 of the bowl 1 and continues to enter the latter until the washer 12 contacts with the seat 11. The washer 12 and the valve in intimate relation thereto descends gradually by reason of the slow return of the fluid into the upper part of the compartment through the by-pass 31, the valves 30 being forced into closed position during the descent of the plunger-rod 10 and the parts carried thereby in the said compartment. The weight devices coöperating with the plunger-rod, together with the weight of the latter and the devices connected thereto, naturally cause a gravitating movement of said plunger-rod, and an immediate closing of the valve-washer 12 against the valve-seat would ensue but for the resistance set up by the liquid below the packing-ring or piston 27. The water entering the bowl may have a direct flow or pass through the usual perforated flushing-ring until a sufficient height is attained, being in this instance about on a level with the top of the double-S trap. When the water has reached this elevation, it forces the small water seal out of the auxiliary siphon-tube 3, and the water subsequently flowing into the double-S trap forces what air remains therein through the auxiliary siphon-tube and causes the trap to be formed into a complete siphon and effectively empty the bowl. The water in both the tube 3 and the double-S trap having found its level remains so until the water is turned into the bowl, as set forth. As the water rises in the bowl it forces the water to rise in the top elbow 4 of the inner member of the trap and compresses the air in this elbow. The water seal in the siphon-tube 3 being of only small volume, the compression of the air in the elbow 4 overcomes the effect of the water seal in the tube 3 and sets up a suction of such force as to cause the water to rapidly flow out from the inner member of the double-S trap through the union or coupling 5 into the outer member of said trap by forming a free passage for all the air in the elbow 4 and allowing the water to rise in the first or inner member of the double-S trap to completely expel all the air through the tube 3, and thus form a true siphon which will operate to thoroughly flush the bowl. In addition, after carrying off the air the tube 3 carries off a part of the water into the last or outer member of the double-S trap, thereby insuring a larger volume in the said member than in the intermediate portion of the trap, with consequent efficiency in the flushing operation, as loss in volume due to friction in the double-S trap is thus overcome. As soon as the flushing operation is complete and the main volume of water turns the lower end or intermediate partition of the double-S trap, allowing the air to pass into the trap with the water, the air rises to the top of elbow 4 and the water seeks its level in both members of the trap and in the tube 3 and so remains until a sufficient volume of water is again allowed to pass into the bowl to suddenly compress the air at the elbow 4 and renew the operation just described. During the flow of the water into the bowl the gravity of the weight 26 on the upper end of the plunger-rod 10 and the downward pressure of the water-supply on the valve-plate 13 cause the latter and the valve-washer 12 to move gradually downwardly and close on the seat 11, the rapidity of this action, as before set forth, being controlled by the adjustment of the valve 33 with respect to the upper terminal of the by-pass. During this downward movement of the plunger-rod 10 through the instrumentalities just explained the surplus liquid that passes into the lower part of the compartment 25 in the initial operation is returned to the upper part of the said compartment through the by-pass 31 solely in view of the fact that the check-valves 30 will be closed by the pressure exerted thereagainst during the downward movement of the plunger-rod.

Having thus fully described the invention, what is claimed as new is—

1. A bowl of the class set forth having a double-S trap an auxiliary siphon-tube located wholly exterior of and terminally connected to the outer and inner portions of the trap to obviate occupation of any interior portion of the trap to avoid detracting from uniformity of flow throughout the length of the trap, and a flushing means located above and connected to the bowl and having an automatic valve operated entirely by gravity and the flow of water behind or on top of the valve, the siphon-tube being independent of the water flushing means and having a water seal formed therein which is automatically overcome when a sufficient head of water is admitted to the bowl.

2. A bowl of the class set forth having a water flushing means communicating therewith, a double-S trap connected to the bowl, and an auxiliary siphon-tube located wholly exterior of the double-S trap and terminally connected to the top of the inner member of the trap above the normal water-level in the latter and to the intermediate portion of the outer member of the trap, the siphon-tube having a water seal formed therein which is automatically overcome when a sufficient head of water is admitted to the bowl, and said siphon-tube wholly independent of the flushing means.

3. A valve mechanism for the purpose set forth consisting of a lower water-supply chamber, an upper liquid cushioning-chamber disposed on the water-supply chamber and independent of and having no communication with the latter chamber, a piston member disposed in the upper liquid cushioning-chamber and having downwardly-opening gravitating valves therein, a plunger connected to the piston and continuing into the water-supply chamber and having a valve on its lower extremity, the part of the plunger within the water-supply chamber being slotted, an operating-lever means extending into the water-supply chamber and loosely engaging the slotted portion of the plunger, the upper extremity of the plunger having a vertical by-pass formed therein with a lower outlet below the piston, a valve engaging the upper extremity of the by-pass, and an annular weight means on the piston around the upper extremity of the plunger, the valve at the lower end of the plunger coöperating with a seat in the water-supply chamber.

In testimony whereof I have hereunto set my hand in presence of two subscribing witnesses.

JACOB F. LEANHART.

Witnesses:
GUY D. ATTKISSON,
CLARENCE YOUNG.